(12) United States Patent
Ihrke et al.

(10) Patent No.: US 9,090,276 B1
(45) Date of Patent: Jul. 28, 2015

(54) SYSTEM AND METHOD FOR CONTAINING ITEMS

(71) Applicants: Evelyn R. G. Ihrke, Angola, NY (US); Hanna C. Ihrke, Angola, NY (US)

(72) Inventors: Evelyn R. G. Ihrke, Angola, NY (US); Hanna C. Ihrke, Angola, NY (US)

(*) Notice: Subject to any disclaimer, the term of this patent is extended or adjusted under 35 U.S.C. 154(b) by 0 days.

(21) Appl. No.: 14/243,470

(22) Filed: Apr. 2, 2014

(51) Int. Cl.
   - *B62D 39/00* (2006.01)
   - *B62B 3/02* (2006.01)
   - *B62B 3/14* (2006.01)

(52) U.S. Cl.
   CPC ............. *B62B 3/027* (2013.01); *B62B 3/148* (2013.01); *B62B 3/1496* (2013.01)

(58) Field of Classification Search
   USPC .......... 280/47.17, 47.26, 47.29, 47.19, 47.24, 280/47.35; 220/23.88, 909, 95
   See application file for complete search history.

(56) References Cited

U.S. PATENT DOCUMENTS

| | | | |
|---|---|---|---|
| 4,984,704 A * | 1/1991 | O'Malley | 220/23.4 |
| 5,700,021 A | 12/1997 | Leatherbury et al. | |
| 6,003,894 A | 12/1999 | Maher | |
| 7,431,312 B2 | 10/2008 | Sebastian et al. | |
| 7,703,776 B1 | 4/2010 | Nugent | |
| 7,878,358 B2 * | 2/2011 | Smudde | 220/23.88 |
| 2010/0102526 A1 * | 4/2010 | Schwager | 280/47.24 |

* cited by examiner

*Primary Examiner* — John Walters
*Assistant Examiner* — James Triggs
(74) *Attorney, Agent, or Firm* — Vincent G. LoTempio; Kloss, Stenger & LoTempio; David T. Stephenson

(57) ABSTRACT

A system and method for facilitating the organization, transport, and storage of items while shopping. A cart provides a mobile transport for carrying at least one detachable container. The container can contain and enable access to items in an organized manner. The items are placed inside the container during selection. The item are removed from the container during check out and returned back inside the container for further transport to a storage area, such as a pantry or refrigerator. At the storage area, the container is detached from the cart for stationary storage in the storage area, or stored as a system with a pantry cart without detaching from the cart. In this manner, the container has the dual purpose of serving as a mobile shopping basket, and a stationary storage container. Additionally, handling of the items is minimized by eliminating the need to transfer the items between containers.

18 Claims, 8 Drawing Sheets

SYSTEM AND METHOD FOR CONTAINING ITEMS

FIELD OF THE INVENTION

The present invention relates generally to a system and method for containing items. More so, the system and method utilizes a cart having detachable and multipurpose containers for shopping, transporting, sorting, and storing of items.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that shopping carts are often comprised of a wheeled frame to which a wire-mesh basket is affixed. The purchased items are placed inside the basket. Many supermarkets provide shopping carts to their customers, where a customer may use the shopping cart while selecting products at the supermarket and then for carrying the products from the supermarket to a vehicle trunk, for example, where the customer may be required to empty the content of the shopping cart into the trunk of a vehicle in order to return the shopping cart.

Urban dwellers, especially those who live in the very large metropolitan areas, often do not own a vehicle and must shop in supermarkets, stores, or markets within walking distance. This means carrying heavy grocery bags from supermarket to home or shopping more frequently in order to buy less on each trip. Shoppers can make their shopping easier by using shopping carts sold to tote groceries home. Once a shopper arrives home, their cart full of groceries has to be unloaded, the groceries sorted, and then stored. Metropolitan apartments, however, tend to have compact kitchens with limited storage space. Space optimization becomes an issue in this case.

Even though the above cited methods for storing and transporting items in a shopping cart address some of the needs of the market, a system and method for containing items with a cart having detachable and multi-purpose containers is still desired.

SUMMARY OF THE INVENTION

The present invention is directed to a system and method for containing items. The system and method may be efficacious for facilitating the organization, transport, and storage of items while shopping. In some embodiments, the system may include a cart that forms a mobile transport for carrying at least one container. The container is configured to receive, contain, and enable access to at least one item in an organized manner. The at least one item may be placed within the container before, during, and after shopping.

In some embodiments, the item may be placed inside the container during selection. The item can then be removed from the container during check out and returned back inside the container for further transport to a storage area. Upon arrival at a storage area, the container, while still holding the items, may be detached from the cart for stationary storage in the storage area. The cart and the attached container can also be stored together in the storage area. In this manner, the container has the dual purpose of serving as a mobile shopping basket, and a stationary storage container. Additionally, handling of the at least one item is minimized by eliminating the need to transfer the items between various containers, such as a shopping cart, a shopping bag, and a pantry shelf.

In one exemplary embodiment, the system and method may be used to shop for, sort, and store grocery items during a grocery shopping trip. The container is initially mounted on the cart for transport to the grocery store. However in other embodiments, the container may be accessed at the store itself. The grocery items are selectively placed in a one of a few containers on the cart. The item may be categorized and placed in an appropriate container. The items are removed individually during check out, and then returned to the appropriate container after the transaction is complete. The items may be identified and priced while still in the container to further minimize handling and save time. After purchasing the grocery items, the container is reattached to the cart, and the cart transports the sorted items to a storage area, such as a pantry or refrigerator at home. The container may then be removed from the cart and positioned or stacked in a pantry or refrigerator. In this manner, storage space in the home may be optimized without necessitating alteration of a pantry or refrigerator. The items may be selectively removed from the container upon demand for use over a duration. When the need arises for an additional grocery shopping trip, the container reattaches to the cart for transport. This multipurpose container forms a reusable, energy conservative system and method when combined with the cart.

In some embodiments, the functional and physical aspects of the cart create a synergy with the at least one container. The cart may have sufficient mobility and structural integrity to carry and support the container and any number of items inside the container. The cart includes a base that forms a support platform having a mobility portion, such as wheels or other mobile mechanism for transporting the cart and container. The cart supports the at least one container in a stacked configuration to maximize space. The cart further includes a support frame that is used to manipulate the cart, and support the container. The support frame includes an inner surface having at least one mount. The support frame forms a substantially convex shape that staggers the mounted containers. The staggered configuration facilitates viewing the items inside the containers for adding and removal. The staggered configuration also facilitate removing multiple containers from the cart since a free space above and below each container is maintained.

In some embodiments, the at least one container contains the item and enables facilitated access to the item. The container may have eclectic shapes, sizes, and fabrications, depending on the type of item being carried, the storage area for the container, and the number of containers in use on the cart. The container may include a plurality of sidewalls that help retain the items within. The sidewalls include at least one mounting aperture that mates with the mount on the support frame through a quick release mechanism. In this manner, the container may form a detachable connection with the support frame. The container can be utilized for transporting the item in the cart, and then removed from the cart with the item inside to form a self-contained container that stores the items in a storage area. The self-contained container stores the items in various storage areas, including, without limitation, a pantry, a cupboard, a refrigerator, a truck, and a freezer. The container may have additional fittings and rails for mating with these various storage areas. In some embodiments, the cart may be independently fabricated from the container, such that the container is provided by an external source, such as a grocery store, where the cart is used for shopping.

A first aspect of the present invention provides a system for transporting and storing items in a cart having a detachable container, comprising:

a cart configured to support and transport at least one container, the at least one container configured to contain at least one item, the cart comprising a support frame configured to detachably join with the at least one container, the support frame comprising a generally convex shape configured to stack the at least one container in a generally staggered configuration, the at least one container further configured to contain the at least one item during transport, the at least one container further configured to contain the at least one item during manipulation of the at least one item, the at least one container further configured to contain the at least one item during detachment from the cart, the at least one container further configured to contain the at least one item during storage in a storage area.

In a second aspect of the present invention, the cart comprises a shopping cart.

In another aspect, the cart is configured to engage a plurality of carts for storage in a nesting configuration.

In another aspect, the support frame is configured to form a generally wave shape.

In another aspect, the support frame comprises a substantially vertical orientation, the support frame further comprising an inner surface and an outer surface, the inner surface comprising at least one mount, the at least one mount disposed to extend along a longitudinal axis of the support frame.

In another aspect, the at least one mount comprises at least one hook mount.

In another aspect, the at least one mount comprises at least one sloped mount.

In another aspect, the support frame comprises a handle, the handle configured to manipulate the cart, the handle further configured to mount a pantry rack.

In another aspect, the cart comprises a base having a substantially horizontal orientation, the base comprising a platform configured to support the at least one item, the base further comprising three wheels configured to transport the cart. However in another embodiment, any number of wheels, tracks, or rails may be used for the mobility portion.

In another aspect, the base comprises a mobility portion configured to transport the cart.

In another aspect, the mobility portion comprises three wheels forming a tricycle configuration. However, more or less wheels could be used.

In another aspect, the at least one container comprises at least one shopping basket.

In another aspect, the at least one container comprises at least one interchangeable container.

In another aspect, at least one container comprises a plurality of sidewalls configured to retain the at least one item.

In another aspect, the plurality of sidewalls comprise at least one mounting aperture configured to at least partially receive the at least one mount for mounting.

In another aspect, the at least one container is configured to detachably move between different mounts on the support frame.

In another aspect, the at least one container is configured to detachably move between the support frame and a storage area.

In another aspect, the at least one container comprises a color coded scheme for categorizing the at least one item.

In another aspect, the storage area comprises a pantry and/or a refrigerator.

In another aspect, a pantry storage area comprises a pantry rack, the pantry rack comprising a substantially vertical orientation, the pantry rack comprising at least one pantry shelf configured to attach to the at least one mounting aperture, the at least one pantry rack further configured to support the at least one container in a substantially staggered configuration.

In another aspect, the at least one item comprises at least one grocery item. However in other embodiments, the item may include, without limitation, an art item, an instrument, a tool, a hygiene, a health care item, a printed matter, a garment, and a computer related product.

In another aspect, manipulation of the at least one item comprises moving the at least one item from the at least one container during purchase of the at least one item, and returning the at least one item to the at least one container after purchase of the at least one item.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 2A illustrates the cart without containers, and FIG. 2B illustrates the cart with mounted containers, in accordance with an embodiment of the present invention;

FIG. 3A illustrates the cart without containers, and FIG. 3B illustrates the cart with mounted containers, in accordance with an embodiment of the present invention;

FIG. 6A illustrates a refrigerator storage area in a refrigerator, and FIG. 6B illustrates an office storage area in a mail room, in accordance with an embodiment of the present invention.

Like reference numerals refer to like parts throughout the various views of the drawings.

DETAILED DESCRIPTION OF THE INVENTION

Figure 1:
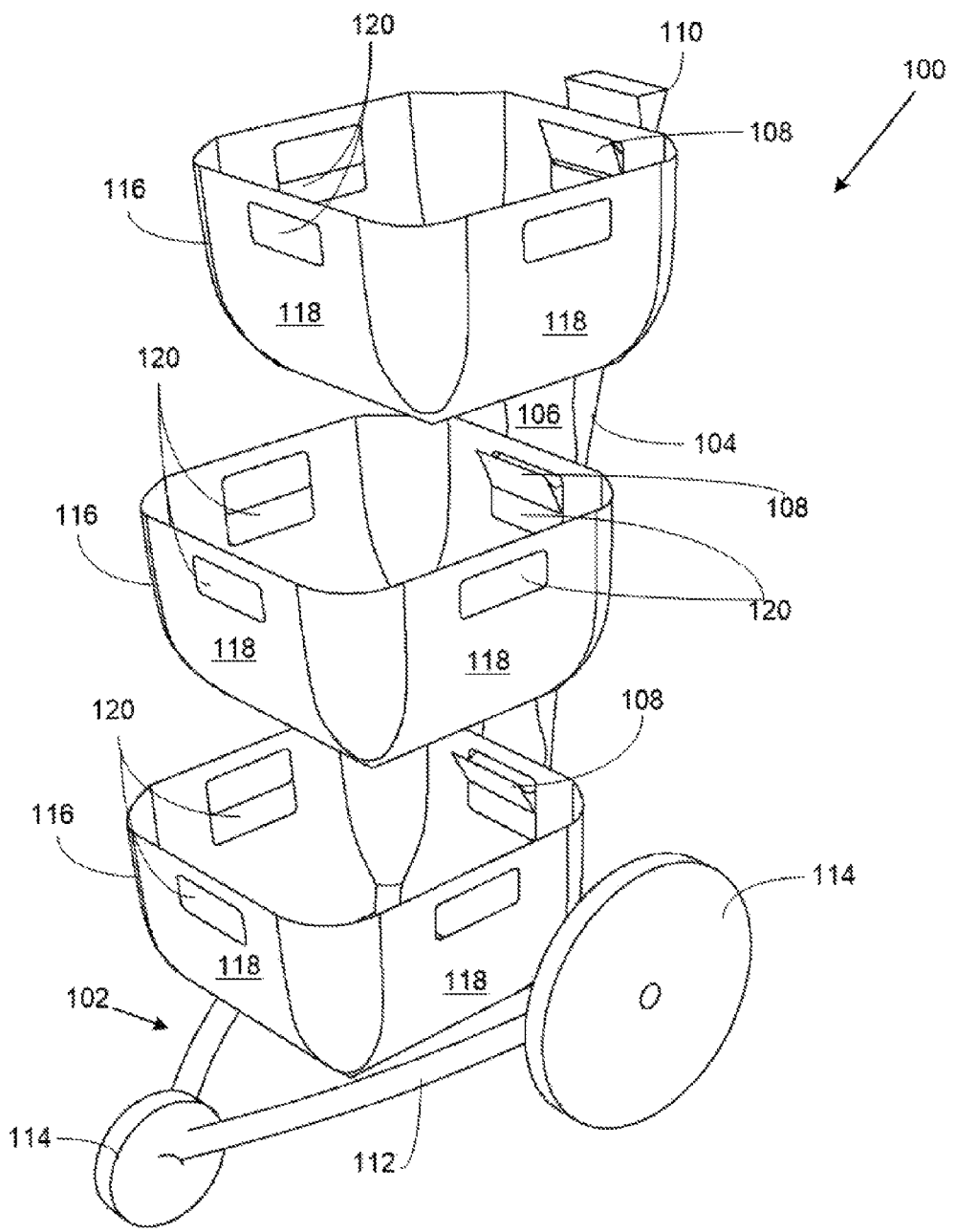
FIG. 1 illustrates a detailed perspective view of an exemplary cart having mounted containers, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific systems and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention presented in FIGS. 1-7, a system 100 and method 700 for containing at least one item. The item may be transported, manipulated, and stored within at least one container 116 that detachably joins with a cart 102. The cart 102 forms a mobile transport for carrying the at least one container 116. The container 116 is sized and dimensioned to contain and enable access to the item. The item may be placed within the container 116 before, during, and after shopping. In one embodiment, the item may be positioned within the container 116 during selection of the item. The item is then be removed from the container 116 during check out and finalization of the transaction. The item may then be returned inside the container 116 for further transport to a final area for storing the container 116 and/or the cart 102. Upon arrival at the storage, the container 116 detaches from the cart 102 for stationary storage. In this manner, the container 116 has the dual purpose of serving as a mobile shopping basket, and a stationary storage container. Space is optimized for the storage without altering the construction thereof. Further, the minimal utilization of exterior containers 116 and handling of the items helps conserve energy and time.

In one exemplary embodiment, the system 100 negates excessive manipulation and transfer of the items between different containers 116 while shopping for groceries. The system also minimizes the use of bags, sacks, and various other containers used while transporting and storing items at a grocery store. The following steps may not be necessary when the system 100 is utilized: obtaining a shopping cart from a store, placing each item to be purchased into the shopping cart 102, removing the items from the shopping cart for identification during check out, placing the items into a shopping bag, positioning the shopping bag into the shopping cart 102, transporting the items home in the shopping bag, taking the items out of the shopping bag, and finally sorting the items for storage on a shelf, pantry, or refrigerator.

The system 100 enables the grocery shopping example to be less intensive and wasteful. For example, the following steps may can be applicable while shopping at a grocery store: joining the at least one container 116 with the cart 102 for transport to the grocery store, transporting the container to the store, selecting and placing at least one item in the container 116, detaching the container 116 from the cart 102 for identifying the item at checkout, pricing each item directly from the container 116 at the checkout, reattaching the container 116 to the cart 102, transporting the cart 102 and the container 116 for final storage, and placing the entire container 116 and/or the container 116 and cart 102 in a desired position for storage. Once home, the containers 116 may be left in the cart 102. The cart 102 can be securely attached to a shelf or docking station of sorts. Alternatively, the containers 116 may be easily lifted off of the cart 102 and used as self-contained storage containers on shelves designed for this use or on any convenient shelf. In any case, the dual purpose functionality of the at least one container 116 facilitates storage and manipulation of the at least one item. Additionally, resources are conserved as numerous plastic and paper bags are not required since the container 116 provides multiple item retaining capacities.

FIG. 1 illustrates a system 100 for transporting and storing items in at least one container 116 that detachably mounts the cart 102. The system 100 may include a cart 102 for transporting and storing the containers 116 and items. The cart 102 may include, without limitation, a hand cart, a shopping cart, a wagon, and a dolly. The cart 102 may require manual force for propulsion, or may include a motor for automated propulsion. In some embodiments, the cart 102 may include a support frame 104 for providing structural integrity and a general framework to the cart 102. The support frame 104 may comprise a substantially vertical orientation relative to a ground surface. The support frame 104 forms a rigid, linear member for support of at least one container 116. The support frame 104 may include a handle 110 on a terminal end for manipulating the cart 102. The support frame 104 may further include an inner surface 106 having at least one mount 108 for mating with the at least one container 116. Suitable materials for the support frame 104 may include, without limitation, metal, rigid polymers, fiberglass, bamboo, and wood.

In some embodiments, the support frame 104 may be configured to form a convex curve that creates a slightly bowed axis towards the inner surface 106. The support frame 104 may also take a wave shape or any other generally curved configuration. The curvature provides multiple advantages. In one instance, the inward, convex curve protrudes towards the inner surface 106 of the support frame 104. Those skilled in the art will recognize that the protrusion provides more space for the knees of a user pushing the cart 102. But more significantly, the convex shape facilitates access to and manipulation of multiple containers 116 stacked along a longitudinal axis of the support frame 104. The stacked containers 116 form a bowed stacking arrangement. This enables a space to form above and beneath each container 116, as the periphery remains uncovered. This space facilitates viewing inside each container 116, and manipulation of each container 116 on the support frame 104.

In some embodiments, the cart 102 comprises a base 112 having a substantially horizontal orientation relative to the ground surface. The base 112 comprises a platform configured to support the at least one item. A mobility portion 114 joins with the base 112 and enables mobility for the cart 102. In one embodiment, the mobility portion 114 may include three wheels configured to transport the cart 102. However, the mobility portion 114 may also include rails, tracks, or more than three wheels for transport. In some embodiments, the cart 102 may be configured to engage a plurality of carts 102. The carts 102 are designed to nest within each other in a line to facilitate collecting and moving many at one time and also to save on storage space. The nest-able design of the carts 102 may be efficacious for reducing floor space necessary for typical shopping carts 102 to a very small footprint.

In some embodiments, the at least one container 116 contains and enables facilitated access to the at least one item. The container 116 may utilize eclectic shapes, sizes, and fabrications. In one embodiment, the at least one container 116 may include a generally rectangular shape and an open end. The container 116 may be machine washable, since after a duration bacteria may have a tendency to build up on the container. However in other embodiments, the container 116 may also be machine washable. A lid (not shown) may be utilized to form a protective cover over the open end of the container 116, and thereby protect the items inside from contaminants, exterior elements, and also provide privacy for the items. Suitable materials for the container 116 may include, without limitation, plastic, polyester, canvas, paper, reed, bamboo, wood, metal, and fish net configurations.

In some embodiments, the container 116 may include a plurality of sidewalls 118 for retaining the item within. The sidewalls 118 may include at least one mount aperture 120 configured to mate with the at least one mount 108 on the support frame 104. The container 116 may be utilized to carry any variety of items. In one embodiment, the item may include at least one grocery item, such as food, drinks, wine, hygiene products, and fuel. In one alternative embodiment, the at least one container 116 comprises a color coded scheme for categorizing the at least one item. In one embodiment, the at least one container 116 may include three containers 116 having a generally pliable, recyclable material and stacked onto the support frame 104. Each container 116 may be utilized for a different grocery item type. At least one mount aperture 120 forms on each upper edge of the sidewalls 118 for enabling mounting on the at least one mount 108.

Figure 2A:
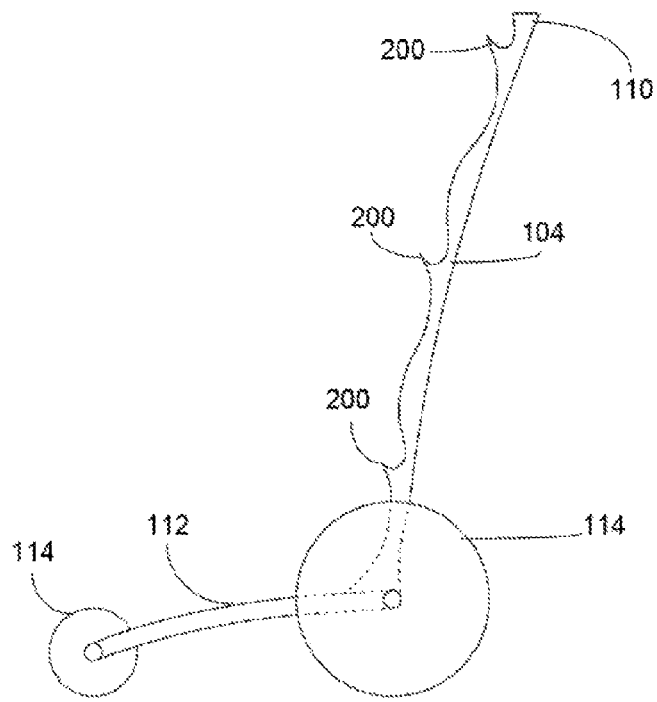
FIGS. 2A and 2B illustrate side views of an exemplary cart having at least one mount as a protrusion, where
Figure 2B:
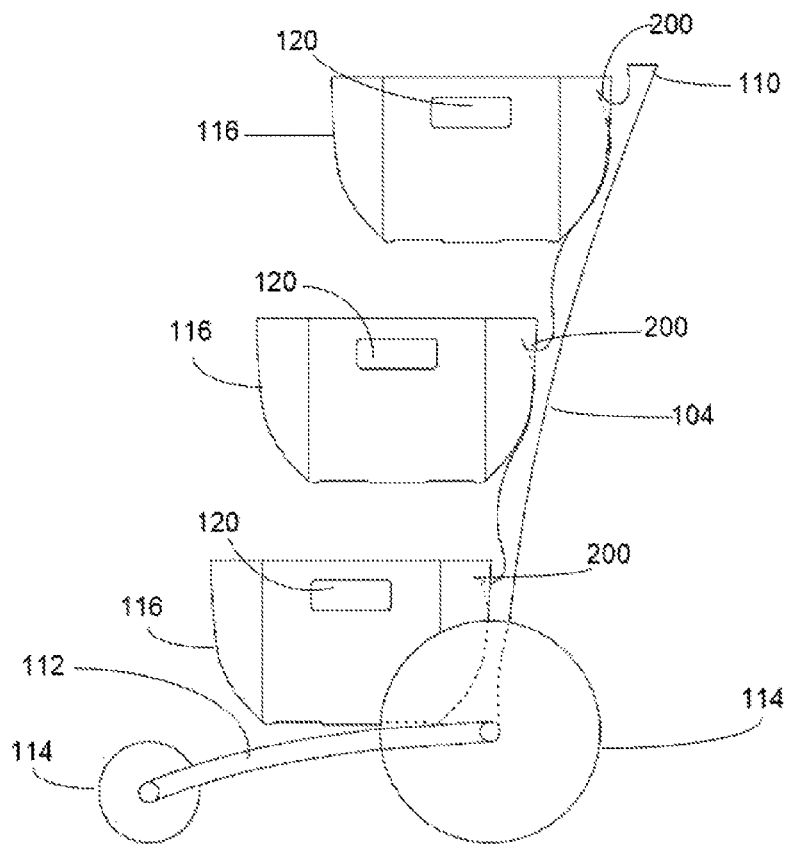

Turning now to FIGS. 2A and 2B, the at least one container 116 may include at least one mount aperture 120 sized and dimensioned to receive the mount 108 in the support frame 104. The at least one mount aperture 120 is sized and dimensioned to enable at least partial passage of the at least one mount 108, which may take numerous shapes and provide various mechanisms for detachably retaining the container 116 on the cart 102. In one embodiment, the at least one mount 108 may include at least one sloped mount 200. The at least one sloped mount 200 forms an upwardly oriented angle between about 10°-80°. The mount 108 aperture from the container slidably engages the sloped mount 200 and remains in place due to gravitational forces and the weight of the container 116 pushing down on the junction between the inner surface 106 and the sloped mount 200. The container 116 may be removed by forcibly pushing or lifting the container 116 over the slope. In yet another possible embodiment of the mount 108, the mount 108 forms an extension that terminates at a lip. The extension slidably receives the mount aperture 120 from the container 116, and the lip acts as a barrier, restricting outward movement by the container 116.

Figure 3A:
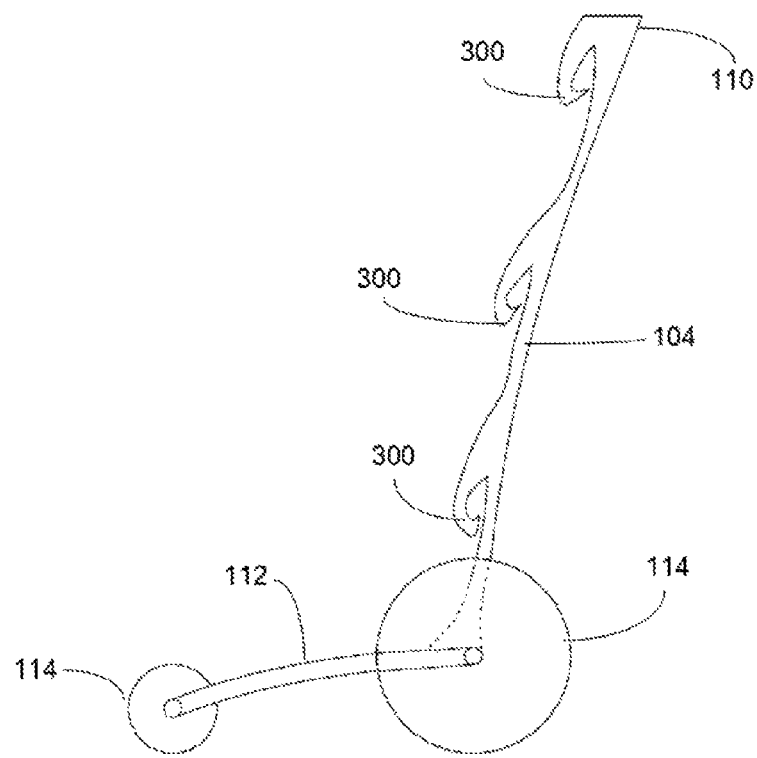
FIGS. 3A and 3B illustrate side views of an exemplary cart having at least one mount as a hook, where
Figure 3B:
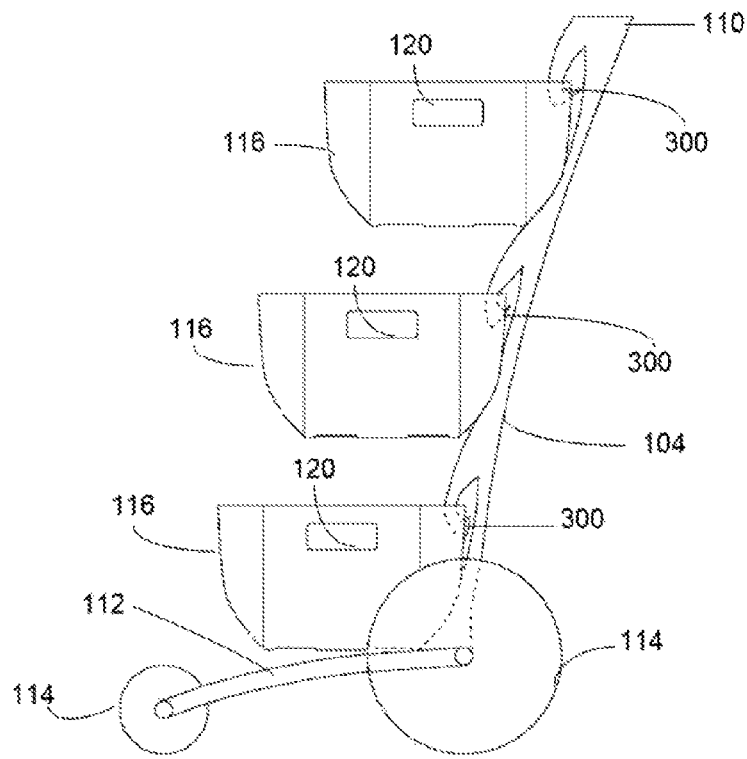

FIGS. 3A and 3B illustrate side views of the cart 102 having at least one hook mount 300 for detachably mounting the at least one container 116. The at least one hook mount 300 may include a hook shaped terminal end that receives the mount aperture 120 inside a formed nook, and restricts additional movement by the container 116. The container 116 may be removed by lifting the container 116 over the hook mount 300 and pushing the container 116 past the hook mount 300.

In one alternative embodiment, a shopper may bring a personal container 116 to a grocery store and utilize a store cart 102. The cart 102 may be checked out for transporting the personal container 116 home, and then returned for shopping at a later time. In yet another embodiment, a shopper may bring a cart 102. The store may sell or rent the container 116 to the shopper for use on the cart 102. The store may sell containers 116 separately, such as with recycling bags, or the store may require the shopper to bring the container 116 and utilize the cart 102 from the store. In another alternative embodiment useful for smaller stores, a co-op may have incentive to invest in the system 100 and use the cart 102 and a storage rack for bulk purchase offerings. Those skilled in the art will recognize that this may help generate two or more revenue streams. The first would be through selling the cart 102 to the individual and also selling the carts 102 in bulk to stores.

Figure 4:
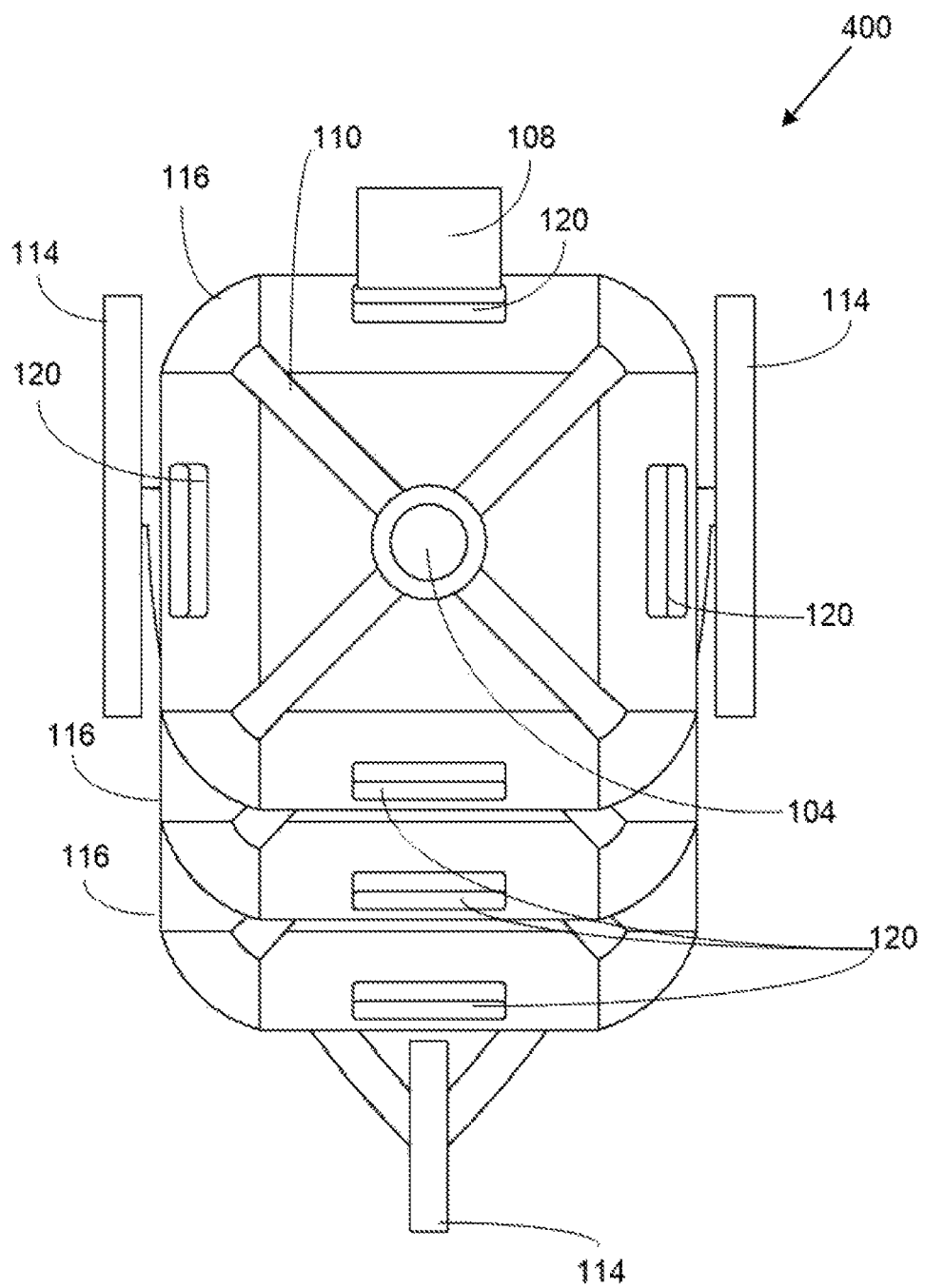
FIG. 4 illustrates a top view of an exemplary cart having mounted containers in an exemplary staggered configuration, in accordance with an embodiment of the present invention.

Turning now to FIG. 4, a plurality of containers 116 may be stacked to form a staggered configuration 400. The convex shape of the support frame 104 enables this staggered configuration 400 to form. However in an alternative embodiment, the support frame 104 may also include misaligned mounts (not shown) that are positioned at different lateral areas on the support frame 104. The lateral positioning of the misaligned mounts enables the containers 116 to have additional space above and below each other for inserting larger items and further facilitating detachment and attachment.

Figure 5:
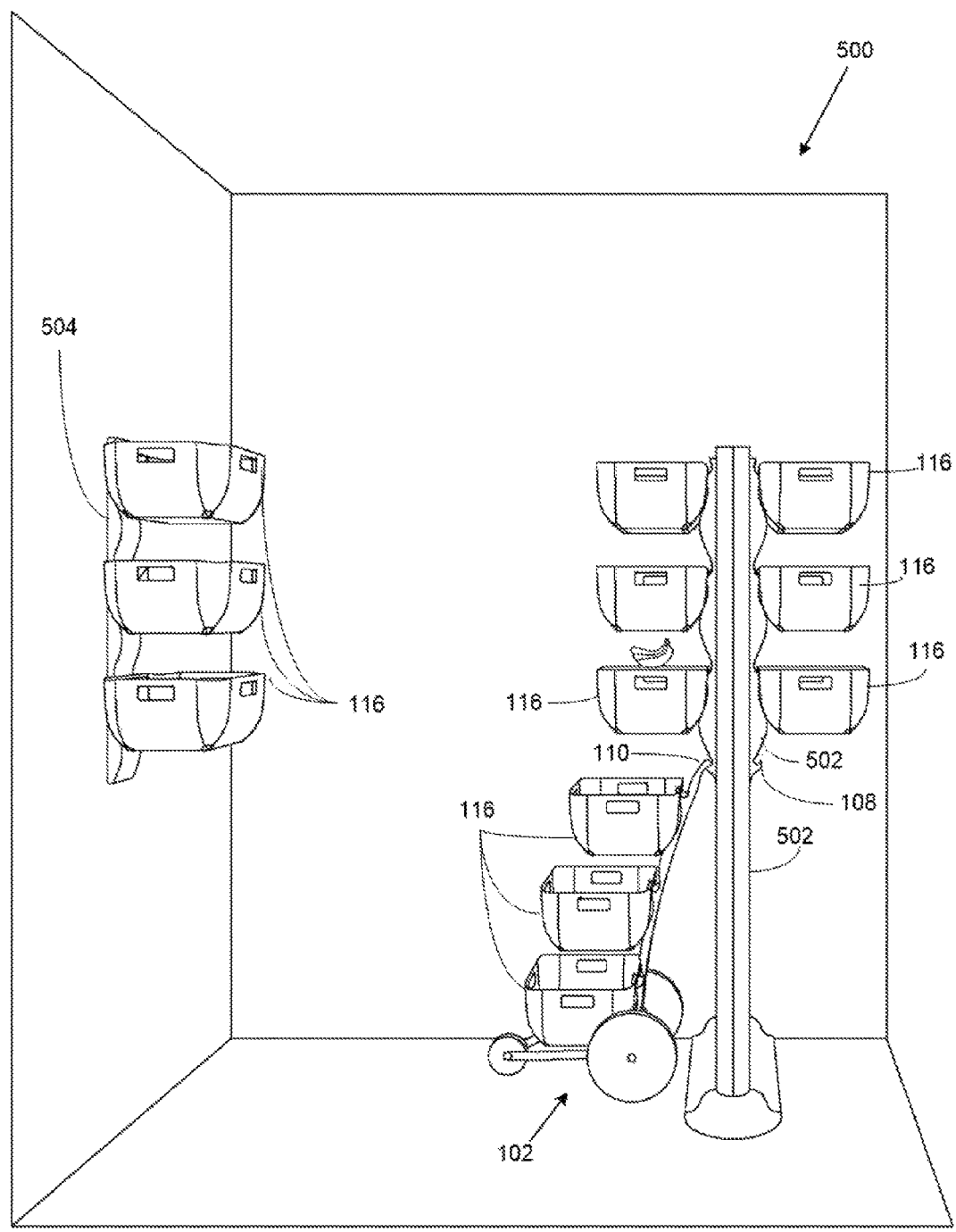
FIG. 5 illustrates a detailed perspective view of an exemplary cart having mounted containers in a storage area of a pantry, in accordance with an embodiment of the present invention.

FIG. 5 illustrates the cart 102 joined with at least one container 116 in a storage area 500. The storage area 500 may include, without limitation, a pantry storage area, a shelf, a cupboard, and a closet. However in other embodiments, the container 116 may form a self-contained container that contains the items in various storage areas, including, without limitation, a pantry, a cupboard, a refrigerator, a truck, and a freezer. The container 116 may have additional fittings and rails for mating with these various storage areas. The at least one container 116 may be detached from the cart 102 with the at least one item inside to form a self-contained container that stores the at least one item in the storage area 500. In another embodiment, the at least one container 116 may remain attached to the cart 102 while the cart 102 itself is attached to a pantry rack 502 in the storage area 500.

The pantry rack 502 may include a substantially vertical frame that supports at least one pantry shelf 504. The pantry shelf 504 receives the at least one container 116 by attaching with the mount aperture 120 for the container 116. The pantry shelf 504 forms a secure support for the handle 110, also providing a structural support for the cart 102 and the attached containers 116. The pantry shelf 504 may utilize any mechanism to mate with the handle 110. Alternatively, the containers 116 may be easily lifted off of the cart 102 and used as self-contained storage containers on the at least one pantry shelf 504, or other shelves designed for supporting the container 116. The pantry shelf 504 may further be configured to support the at least one container 116 in a substantially staggered configuration 400.

Figure 6A:
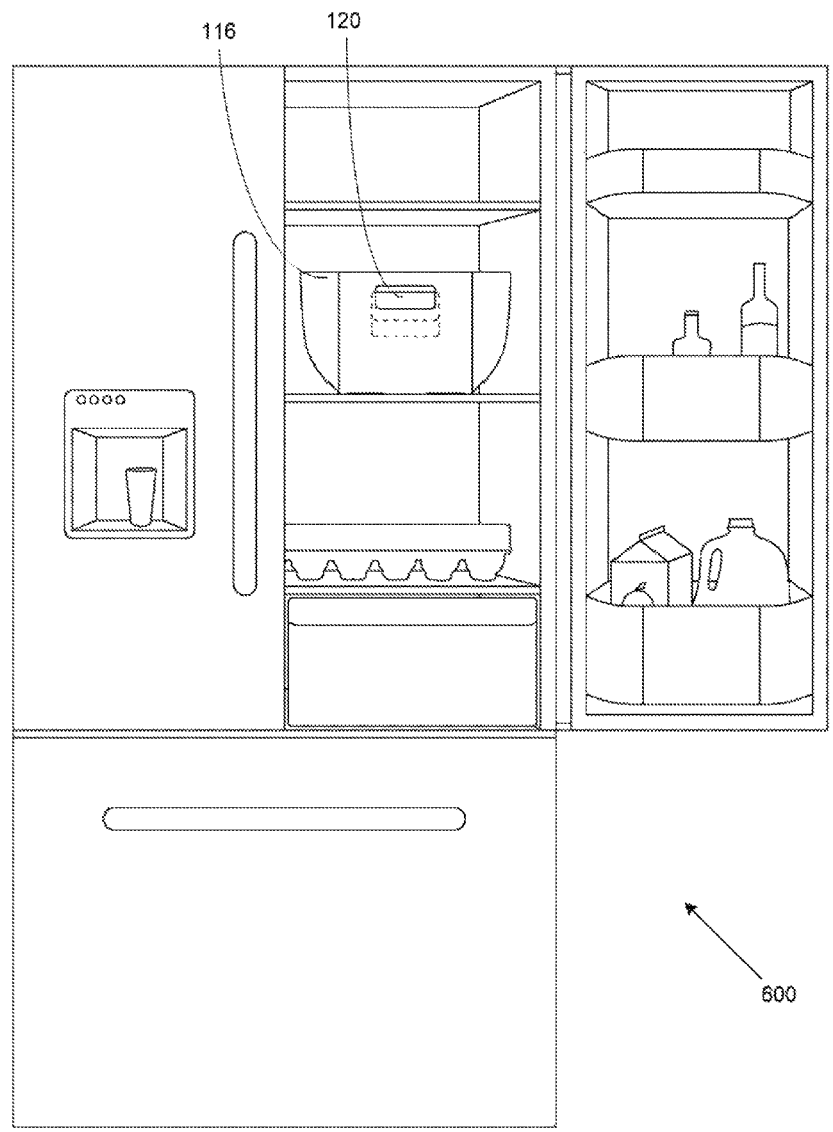
FIGS. 6A and 6B illustrate detailed perspective views of an exemplary cart having mounted containers in alternative storage areas, where

FIG. 6A illustrates the at least one container 116 stored in a refrigerator storage area 600. The container 116 may be sized and dimensioned to form a refrigerator crisper drawer so that perishable goods or food items that require chilling may detached from the cart 102 and placed into the refrigerator while still in the container 116. The container 116 may also include rails to slide into a compartment in the refrigerator storage area 600. In this embodiment, the container 116 may be configured to withstand cold temperatures and inhibit moisture buildup with a sealed lid. The container 116 may also include a humidity control feature powered externally by the refrigerator, or with a portable battery. Items that may be contained in this container 116 in refrigerator storage area 600 may include, without limitation, wine, drinks, vegetables, fruit, milk, meat, and eggs. The container 116 may utilize eclectic shapes, sizes, and fabrications, depending on the type of item being carried, a storage area for the container 116, and the number of containers 116 in use on the cart 102. In one alternative embodiment, the at least container 116 may be configured to contain nonedible items, including, medical instruments for storage in a medicine cabinet storage area, automotive tools for storage in a tool box storage area, and bait for storage in a fish tackle box storage area.

Figure 6B:
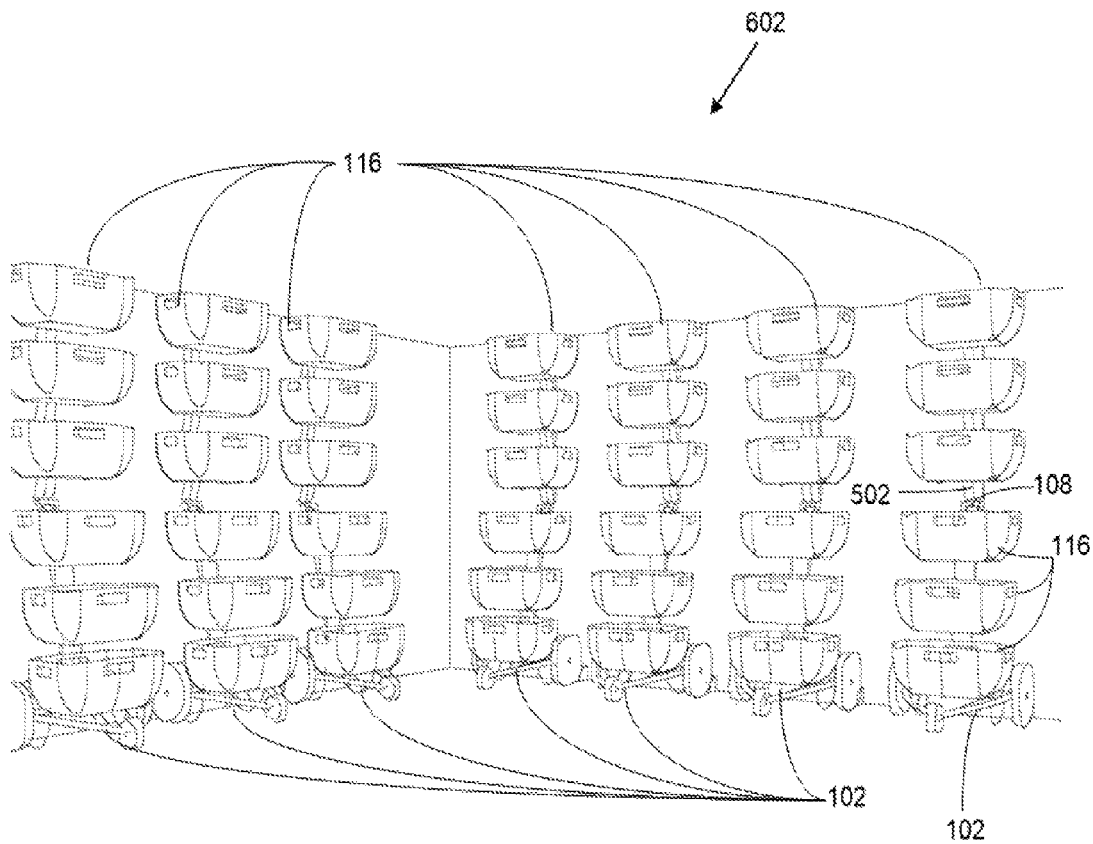

FIG. 6B illustrates the at least one container 116 stored in an office storage area 602. From the office storage area 602, the at least one container 116 may be utilized for various office duties, rather than the aforementioned shopping affairs. For example, without limitation, the cart 102 may transport the at least one container 116 between cubicles to deliver or pick up mail items. The cart 102 may then be transported to a mail room where the container 116 may be stacked on a pantry rack 502 designed for receiving a greater volume of containers 116, such as in a mail room. This office embodiment may offer more commercial benefits than the grocery shopping version. The office storage area 602 could be sold as a unit office. Or, the pantry racks 502, the cart 102, and the at least one container 116 could be sold together or separately as office furniture. The material composition could include elegant mahogany wood in one embodiment. Furthermore, using the cart, 102, the container 116, and the pantry rack 502 in an office setting may require dimensioning the containers 116 to accommodate hanging files, file drawers, mail rooms, and the like.

Figure 7:
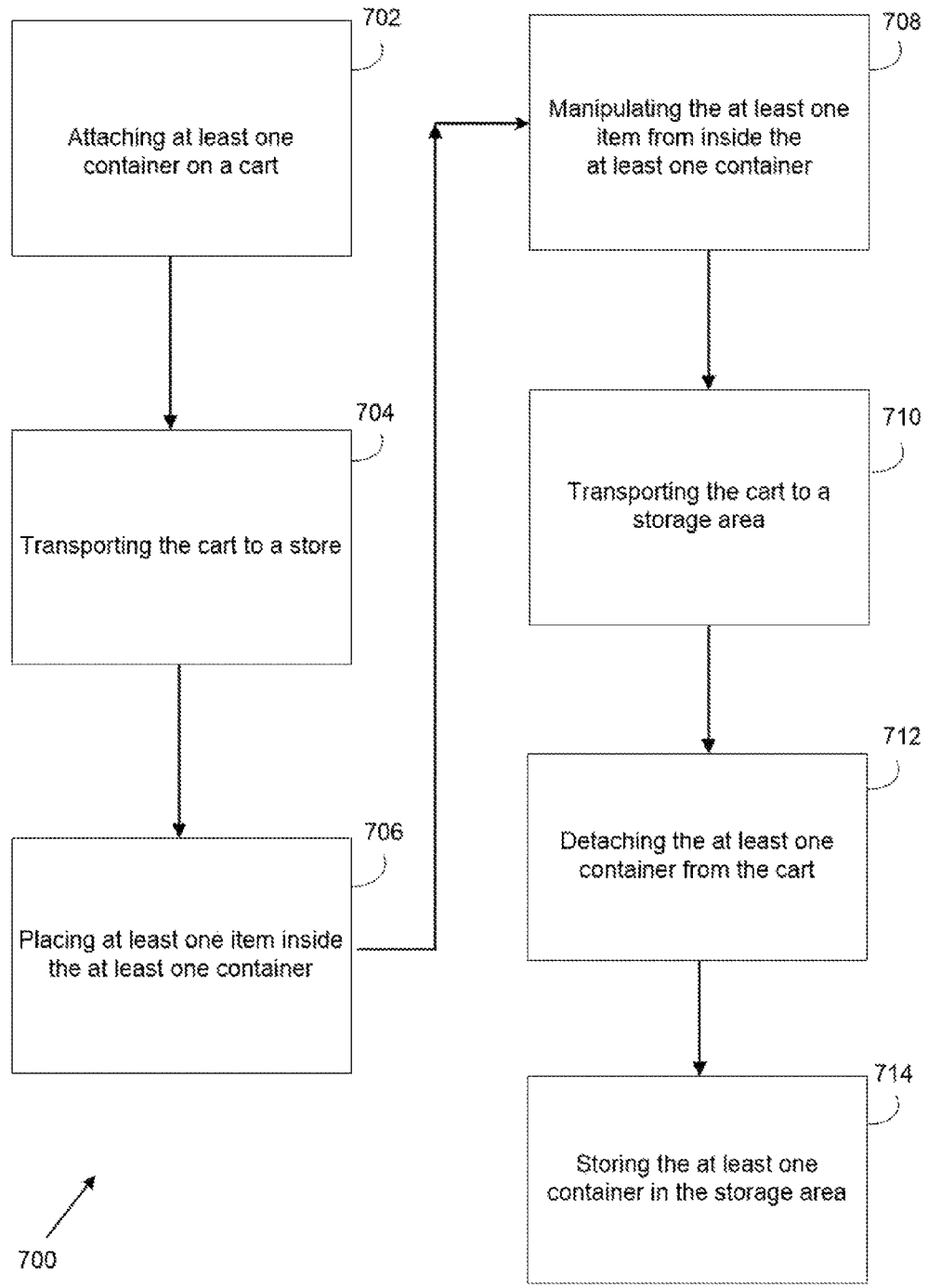
FIG. 7 illustrates a flowchart for an exemplary method for containing items in a detachable container, in accordance with an embodiment of the present invention.

FIG. 7 illustrates a flowchart diagram of a method 700 for containing items. The method 700 contains at least one item within at least one container 116 that detachably joins with a cart 102. The cart 102 forms a mobile transport for carrying the container 116. The container 116 is configured to contain and enable access to the item. The item may be placed within the container 116 before, during, and after shopping.

The method 700 may include an initial Step 702 of attaching at least one container 116 on a cart 102. The cart 102 may include, without limitation, a hand cart, a shopping cart, a wagon, and a dolly. The cart 102 comprises a support frame 104 having a substantially vertical orientation relative to a ground surface. The support frame 104 forms a rigid, linear member for support of at least one container 116. The support frame 104 may further include an inner surface 106 having at least one mount 108 for mating with the at least one container 116. In some embodiments, the method 700 may further comprise a Step 704 of transporting the cart 102 to a store. The cart 102 may require manual force for propulsion, or may include a motor for automated propulsion. The container 116 may be interchangeable, supplied by a shopper, or supplied by the store.

A Step 706 includes placing the at least one item in the at least one container 116. The container 116 may include a plurality of sidewalls 118 for retaining the item within. The container 116 may be utilized to carry any variety of items. In one embodiment, the item may include at least one grocery item, such as food, drinks, health care items, printed matter, hygiene products, and fuel. In some embodiments, a Step 708 comprises manipulating the at least one item from inside the at least one container 116. The item may be identified and purchased from inside the container 116. In one example, a store clerk may orient the container to view the contents and then scan the items for pricing. This enables minimal handling of the items, such as from a shopping cart 102, to a clerk checkout, to a shopping bag, and back to the shopping cart 102 with each individual shopping bag. The container 116 may then be reattached to the cart 102 with the items inside.

A Step 710 includes transporting the cart 102 to a storage area 500. The cart 102 enables facilitated transport of heavy loads of items obtained at the store. In this manner, individual bags are not required. In some embodiments, a Step 712 may include detaching the at least one container 116 from the cart 102. At least one mount aperture 120 is sized and dimensioned to receive the mount 108 in the support frame 104. The at least one mount aperture 120 is sized and dimensioned to enable at least partial passage of the at least one mount 108, which may take numerous shapes and provide various mechanisms for detachably retaining the container 116 on the cart 102. In one embodiment, the at least one mount 108 may include at least one sloped mount 200. The at least one sloped mount 200 forms an upwardly oriented angle between about 10°-80°. The mount aperture 120 on the container 116 slidably engages the sloped mount 200 and remains in place from gravitational forces and the weight of the container 116 pushing down on the junction between the inner surface 106 and the sloped mount 200. The container 116 may be detached from the sloped mount 200 by lifting over the terminal end of the sloped mount 200. A final Step 714 comprises storing the at least one container 116 in the storage area 500. The cart 102 may remain joined with the at least one container in the storage area 500. However in other embodiments, the container 116 may form a self-contained container that contains the items in various storage areas, including, without limitation, a pantry, a cupboard, a refrigerator, a truck, and a freezer.

In one alternative embodiment, the cart 102 could be used to store and deliver magazines, food, and duty free items on an airplane. Similarly, indoor or outdoor vendors could use the cart 102 to assist in their various needs. In yet another alternative embodiment, business offices may utilize the cart 102 and pantry rack 502 to deliver or collect mail, store files or projects, or use the organizing capabilities of the pantry rack 502 by having the items in the container 116 labeled for research or reference.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A system for transporting and storing items in a cart having a detachable container, the system comprising:
   a cart configured to support and transport at least one container, the at least one container configured to contain at least one item,
   the cart comprising a support frame configured to detachably join with the at least one container, the support frame comprising a generally convex shape configured to stack the at least one container in a generally staggered configuration,
   the cart having at least one cart hook mount for detachably mounting the at least one container,
   the at least one container further configured to contain the at least one item during transport,
   the at least one container further configured to contain the at least one item during manipulation of the at least one item, the at least one container further configured to contain the at least one item during detachment from the cart, the at least one container further configured to contain the at least one item during storage in a storage area, at least one pantry shelf having at least pantry shelf hook mount for detachably mounting the at least one container, the at least one container comprising a plurality of sidewalls configured to retain the at least one item, the plurality of sidewalls comprising at least one mounting aperture, wherein said mounting aperture is a hole in the sidewall, configured to be compatible for mounting with the cart hook mount of the cart and configured to be compatible for mounting with the pantry shelf hook mount of the pantry shelf, the at least one container, when mounted on said cart hook mount is vertically separated from an at least one additional container;

the at least one container, when mounted on said hook mount is vertically separated from an at least one additional container.

2. The system of claim 1, in which the cart comprises a shopping cart.

3. The system of claim 1, in which the cart is configured to engage a plurality of carts for storage in a nesting configuration.

4. The system of claim 1, in which the pantry shelf has a pantry shelf wave shape at least partially extending beneath a portion of the at least one container and said pantry shelf wave shape being substantially complementary to a shape of the at least one container, the support frame of said cart having a cart wave shape at least partially extending beneath a portion of the at least one container and said cart wave shape being substantially complementary to a shape of the at least one container.

5. The system of claim 1, in which the support frame comprises a substantially vertical orientation, the support frame further comprising an inner surface and an outer surface, the inner surface comprising the at least one cart hook mount, the at least one cart hook mount disposed to extend along a longitudinal axis of the support frame.

6. The system of claim 1, in which the at least one cart hook mount comprises at least one sloped cart hook mount.

7. The system of claim 1, in which the support frame comprises a handle, the handle configured to manipulate the cart, the handle further configured to mount a pantry rack.

8. The system of claim 1, in which the cart comprises a base having a substantially horizontal orientation, the base comprising a platform configured to support the at least one item, the base further comprising three wheels configured to transport the cart.

9. The system of claim 1, in which the at least one container is configured to detachably move between different cart hook mounts on the support frame, the at least one container further configured to detachably move between the support frame and a storage area, the at least one container further configured to detachably move between the support frame and a storage area.

10. The system of claim 1, in which a pantry storage area comprises a pantry rack, the pantry rack comprising a substantially vertical orientation, the pantry rack comprising the at least one pantry shelf configured to attach to the at least one mounting aperture, the at least one pantry rack further configured to support the at least one container in a substantially staggered configuration.

11. The system of claim 1, in which the cart comprises a subsystem of a pantry rack.

12. The system of claim 1, in which manipulation of the at least one item comprises moving the at least one item from the at least one container during purchase of the at least one item, and returning the at least one item to the at least one container after purchase of the at least one item.

13. The system of claim 1, in which the at least one cart hook mount includes a hook shaped terminal end that receives the mount aperture inside a formed nook.

14. The system of claim 1, in which the cart is configured to be tipped in a range from about 30 degrees in a direction toward a user to about 120 degrees in a direction away from the user without the at least one container being dislodged from the cart hook mount.

15. The system of claim 1, in which the at least one container, when mounted on said cart hook mount or said pantry shelf hook mount is vertically separated by a space greater than a height of a section of the sidewall above the mount aperture such that during removal of the container from the cart hook mount or pantry shelf hook mount the additional container does not interfere with removal of said container.

16. A system for transporting and storing items in a cart having a detachable container, the system comprising:

a cart configured to support and transport at least one container, the at least one container configured to contain at least one item, the cart comprising a support frame configured to detachably join with the at least one container, the support frame comprising a generally convex shape configured to stack the at least one container in a generally staggered configuration, the cart having at least one mounting means for detachably mounting the at least one container, the at least one container further configured to contain the at least one item during transport, the at least one container further configured to contain the at least one item during manipulation of the at least one item, the at least one container further configured to contain the at least one item during detachment from the cart, the at least one container further configured to contain the at least one item during storage in a storage area, at least one pantry shelf having at least one mounting means for detachably mounting the at least one container, the at least one container comprising a plurality of sidewalls configured to retain the at least one item, the plurality of sidewalls comprising at least one mounting aperture compatible with the mounting means of the cart and the mounting means of the pantry shelf, and configured to at least partially receive the at least one mounting means for mounting.

17. The system of claim 16, in which a pantry storage area comprises a pantry rack, the pantry rack comprising a substantially vertical orientation, the pantry rack comprising the at least one pantry shelf configured to attach to the at least one mounting aperture, the at least one pantry rack further configured to support the at least one container in a substantially staggered configuration.

18. A system for transporting and storing items in a cart having a detachable container, the system comprising:

a cart configured to support and transport at least one container, the at least one container configured to contain at least one item, the cart comprising a support frame configured to detachably join with the at least one container, the support frame comprising a generally convex shape configured to stack the at least one container in a generally staggered configuration, the cart having at least one cart hook mount for detachably mounting the at least one container, the at least one container further configured to contain the at least one item during transport, the at least one container further configured to contain the at least one item during manipulation of the at least one item, the at least one container further configured to contain the at least one item during detachment from the cart, the at least one container further configured to contain the at least one item during storage in a storage area, at least one pantry shelf having at least one pantry shelf hook mount for detachably mounting the at least one container, the pantry shelf having the at least one container comprising a plurality of sidewalls configured to retain the at least one item, the plurality of sidewalls comprising at least one mounting aperture, wherein said mounting aperture is a hole in the sidewall, configured to be compatible for mounting with the cart hook mount of the cart and configured to be compatible for mounting with the pantry shelf hook mount of the pantry shelf, the pantry shelf having a pantry shelf wave shape at least partially extending beneath a portion of the at least one container and said pantry shelf wave shape being substantially complementary to a shape of the at least one container, the support frame of said cart having a cart wave shape at least partially extending beneath a portion of the at least one container and said cart wave shape being substantially complementary to the shape of the at least one container, wherein the cart hook mount has a shaft connected to the support frame, said shaft defined herein to include a bend, and the cart hook mount has a hook end, wherein the hook end is between the shaft and the support frame, and wherein said hook end is above a lowest point on the shaft and below a location where said shaft is connected to said support frame.

* * * * *